US007148985B2

(12) United States Patent
Christodoulou et al.

(10) Patent No.: US 7,148,985 B2
(45) Date of Patent: Dec. 12, 2006

(54) MANAGEMENT OF PRINT SERVICES

(75) Inventors: Athena Christodoulou, Bristol (GB); Richard Taylor, Bristol (GB); Christopher Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

(21) Appl. No.: 10/198,843

(22) Filed: Jul. 18, 2002

(65) Prior Publication Data

US 2003/0016388 A1    Jan. 23, 2003

(30) Foreign Application Priority Data

Jul. 21, 2001    (GB)    ................... 0117886.2

(51) Int. Cl.
    *G06F 15/12*    (2006.01)
(52) U.S. Cl. .................... 358/1.15; 358/1.15; 358/1.13
(58) Field of Classification Search ............... 358/1.15, 358/1.14, 1.13, 296, 1.1; 705/51
See application file for complete search history.

(56) References Cited

U.S. PATENT DOCUMENTS

| 5,287,194 | A | * | 2/1994 | Lobiondo | .................... 358/296 |
| 5,327,526 | A | * | 7/1994 | Nomura et al. | ............ 358/1.16 |
| 5,774,356 | A | | 6/1998 | Hisatake et al. | ............... 700/28 |
| 5,970,224 | A | * | 10/1999 | Salgado et al. | ............ 358/1.16 |
| 6,130,757 | A | * | 10/2000 | Yoshida et al. | ............ 358/1.15 |
| 6,373,585 | B1 | | 4/2002 | Mastie et al. | ............... 358/1.15 |
| 6,389,121 | B1 | | 5/2002 | Terao | .................... 379/100.08 |
| 6,650,433 | B1 | * | 11/2003 | Keane et al. | ............... 358/1.15 |
| 6,687,018 | B1 | * | 2/2004 | Leong et al. | ............... 358/1.15 |
| 6,771,386 | B1 | | 8/2004 | Kato | .......................... 358/1.15 |
| 2002/0105668 | A1 | * | 8/2002 | Lilland et al. | ............. 358/1.14 |
| 2002/0131059 | A1 | * | 9/2002 | Tsuchitoi | .................... 358/1.1 |
| 2002/0198843 | A1 | * | 12/2002 | Wang et al. | ................... 705/51 |
| 2003/0020944 | A1 | * | 1/2003 | Bhogal et al. | ............. 358/1.15 |
| 2003/0046408 | A1 | * | 3/2003 | Weaver et al. | ............. 709/229 |
| 2003/0071726 | A1 | * | 4/2003 | Hopper et al. | ............. 340/540 |
| 2003/0090705 | A1 | * | 5/2003 | Ferlitsch | .................... 358/1.15 |
| 2003/0103777 | A1 | * | 6/2003 | Nakamura et al. | ............ 399/82 |
| 2003/0133146 | A1 | * | 7/2003 | Parry | ......................... 358/1.15 |
| 2003/0161641 | A1 | * | 8/2003 | Edmonds | ..................... 399/23 |
| 2003/0202204 | A1 | * | 10/2003 | Terrill et al. | ................ 358/1.15 |

FOREIGN PATENT DOCUMENTS

| EP | 0 595 594 A1 | 5/1994 |
| JP | 10-143340 | 5/1998 |
| JP | 2000250726 A | 9/2000 |

* cited by examiner

Primary Examiner—Kimberly Williams
Assistant Examiner—Ashish K. Thomas

(57) ABSTRACT

Print jobs requested are scheduled to be performed during available time slots, and on suitable printers having lowest associated overhead cost. In the event that no technically suitable printer is available a print services management programme determines whether it is economically viable to cancel one or more pre-scheduled print jobs in favour of the requested job, taking into account, for example, the price of the requested job and scheduled jobs. In a development a bidding routine establishes at what price it is viable to cancel a scheduled job in favour of a requested job, and that price is then offered to a customer. Future work inflow is predicted and represented in the form of virtual jobs which are scheduled in the same manner as actual jobs, but whose value is representative of the likelihood of the job maturing into an actual job. In a further development, demand on printer hardware arising from the scheduling of virtual jobs is used to monitor predicted future hardware requirements, and when virtual demand exceeds a threshold, an order is placed for procurement of further hardware.

26 Claims, 9 Drawing Sheets

| # | CUST ID | MEDIA | JOB | F'SHING | D'ERY | CASH | STATUS |
|---|---------|-------|-----|---------|-------|------|--------|
| 05437 | LFC111 | 500A4Q1, 50RGB | SS-8PT; 2GbW; 40MBP | 2-SIDE; BIND4 | 13082001 | 25K | U |
| 05436 | ACM321 | 200B3Q2, 60BW | TNR-12PT, 50KW | 1-SIDE; L/LF | 10082001 | 0 5K | P3,09082001123300 |
| 05435 | BSE224 | 250A5Q2, 20BW | ARL-10PT; 200KW | 2-SIDE, L/LF | 08082001 | 10K | DONE |
| n | | | | | | | |

Fig. 3A

| | JOB SCHEDULER - PRINTER P1 | |
|---|---|---|
| # | START | DURATION |
| 09380 | 14072001; 1400 | 200 |
| 08572 | 23072001, 1800 | 18 |

Fig. 3B

| | PRINTER P1: MEDIA LOG - PAPER | | |
|---|---|---|---|
| PAPER SIZE | LVS. IN STOCK | SCH. USEAGE 1 | QBUFFER |
| A4 | 5000K | 3850.637K | 50K |

Fig. 3C

| | PRINTER P1: MAINTENANCE LOG - ROLLER | | |
|---|---|---|---|
| ROLLERID | MAINT ROLLER CYCLE | SCH. ROLLER CYCLE | PBUFFER |
| 1 | 2000K | 150K | 75K |

Fig. 3D

| | | CUSTOMER RECORD | | | |
|---|---|---|---|---|---|
| CUSTOMER NAME | CUST ID | ADDRESS | TEL | JOBS DONE | JOBS BOUNCED |
| Paragon Adhesive | PAD265 | 13 Bad Luck St | 123-4567 | 0243<br>0251<br>0560 | 0251 |

| PRINTER LOG | | | | | | |
|---|---|---|---|---|---|---|
| PRINTER ID | SPEED | PAPER SIZES | MEDIA CAP | COLOUR? | PAGINATION | COST RATING |
| MAMOTH | 20P/MIN | A1,A2,A3,A4,A5 | 500LVS, 5TCART | Y | 1, 2, | 1 |

Fig. 3E

| FINISHING LOG | | | | |
|---|---|---|---|---|
| ID | COMP PRINTERS | BINDING | CAPACITY | COST RATING |

Fig. 3F

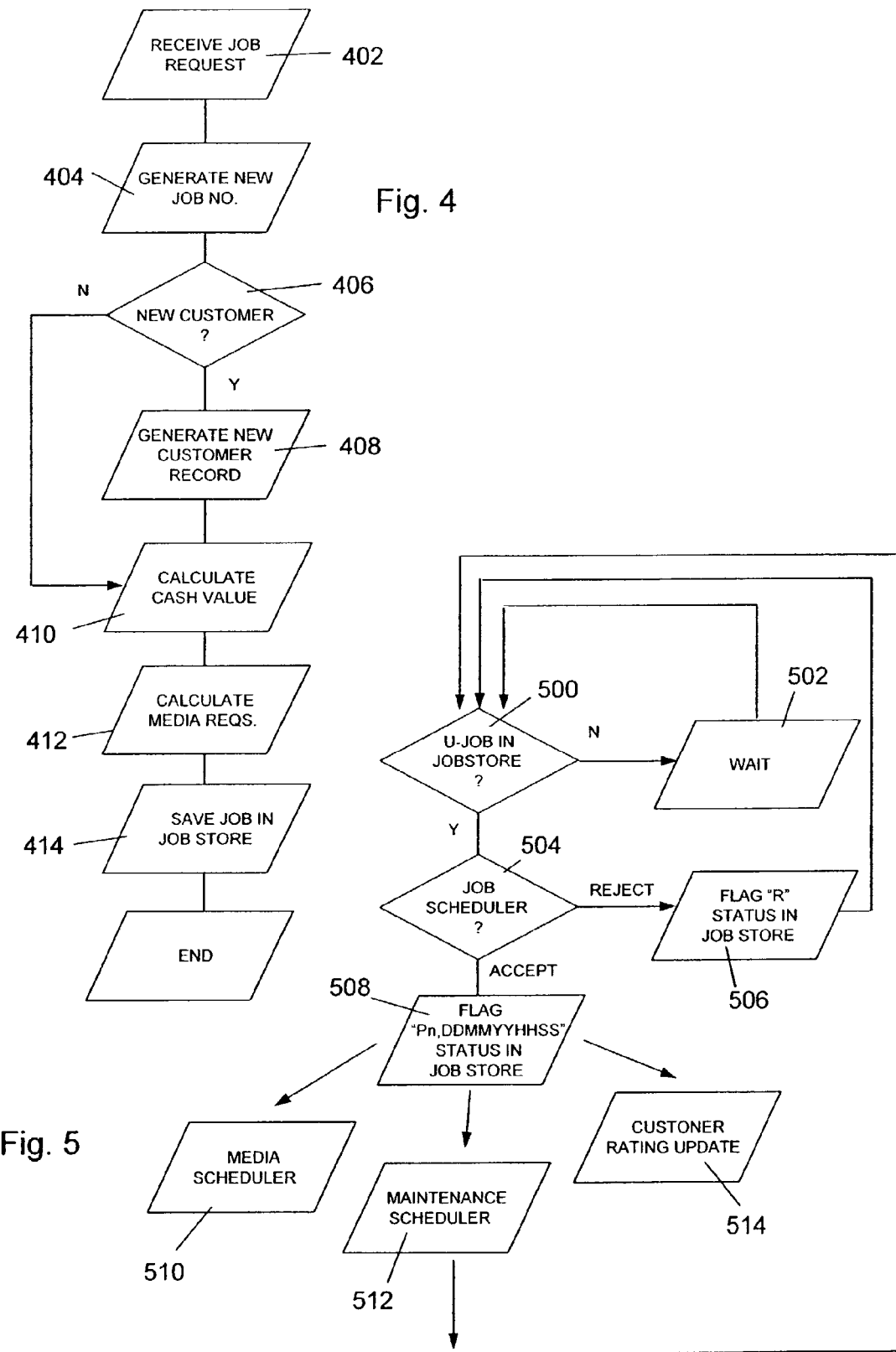

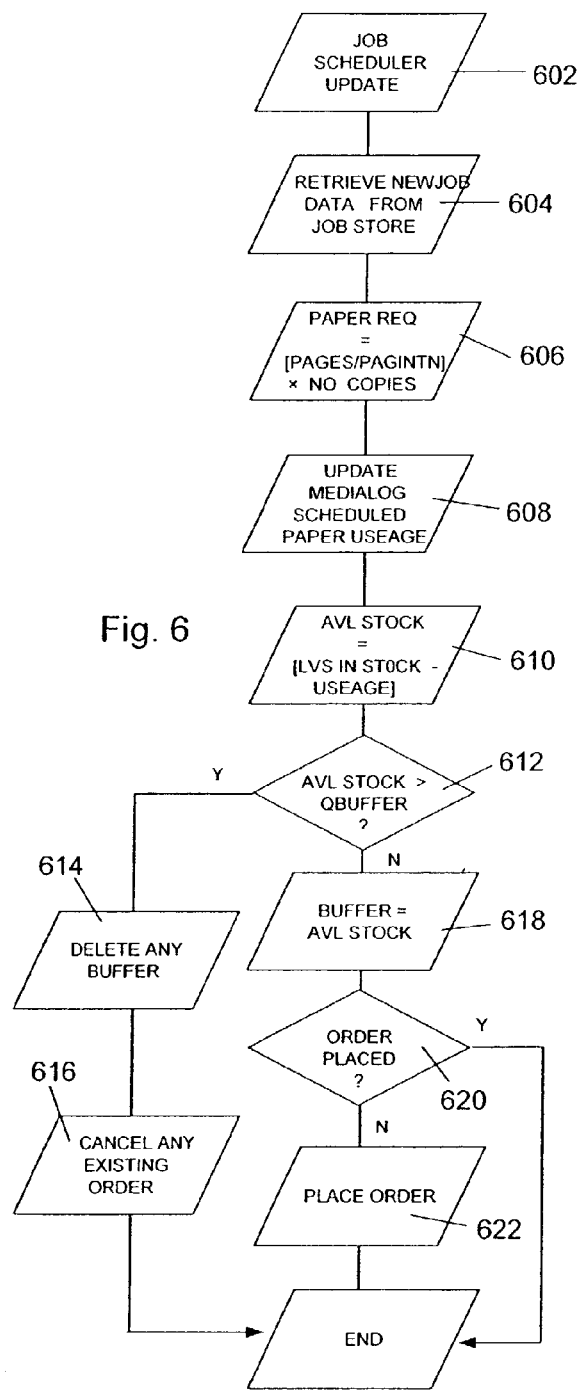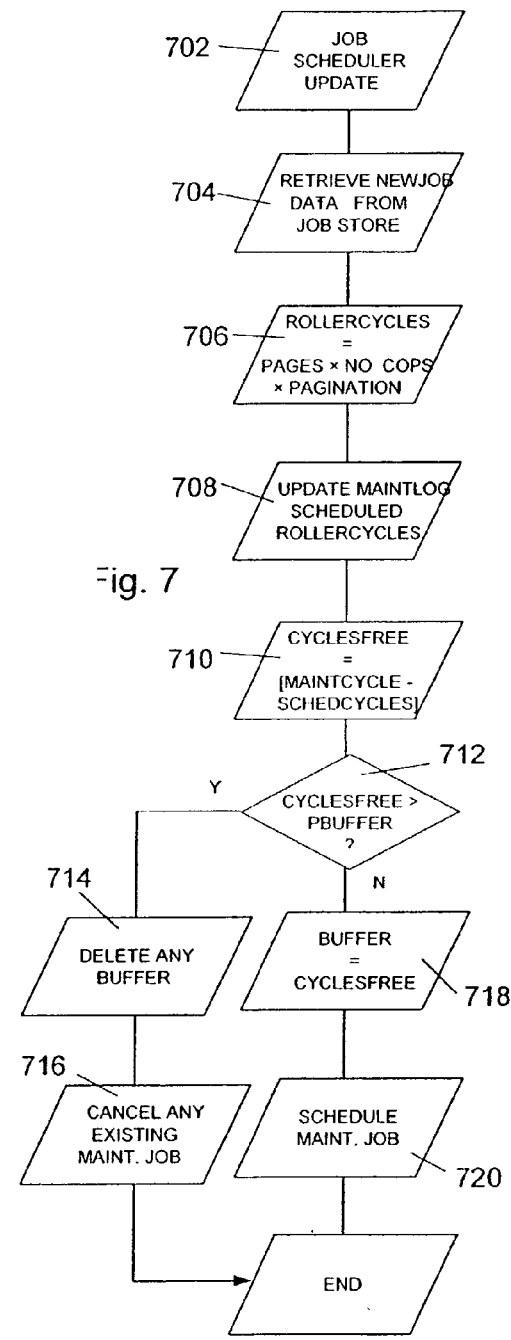

MANAGEMENT OF PRINT SERVICES

BACKGROUND TO THE INVENTION

The present invention relates to the management of print services, such as for example the management of job and maintenance scheduling, and the procurement of print media.

It may frequently occur that a print shop undertakes to perform a particular print job because, at the time the job was commissioned, the capacity was available to perform the job. The commercial value of the job in question may not however be particularly high. A subsequent job of significantly greater commercial value to the print shop may then be refused because of commitments made vis-à-vis the job already accepted, even though this course of action now represents a loss to the print shop.

SUMMARY OF THE INVENTION

A first aspect of the present invention provides a print management system which ameliorates the above-mentioned problem. According to a first aspect of the present invention there is provided a method of managing print services comprising the steps of:
 determining which of a plurality of printers are intrinsically capable of performing a requested print job by a requested deadline, determining whether sufficient scheduling space is available on at least one of the intrinsically capable printers to perform the requested job by the deadline, and in the event sufficient scheduling space is not available:
  (a) retrieving data relating at least one candidate print job scheduled for commencement on one of the intrinsically capable printers prior to the deadline;
  (b) allocating a value for each candidate print job in respect of which data is retrieved; and
  (c) in the event a candidate print job has a lower value than the requested job, cancelling the lower value candidate job and scheduling the requested job for completion by the deadline.

By determining the value of each candidate job and comparing it with that of a requested print job it becomes possible to determine, on the basis of one or more predetermined criterion, whether refusal of a requested print job in favour of one or more print jobs (which have already been scheduled) represents a loss. In a preferred embodiment the value of each candidate print job is the commercial value (such as the pecuniary value), and is calculated from a combination of the cash value of the job (i.e. the cash generated once costs such as media, maintenance and overheads have been taken into consideration), and a weighting factor relating to the customer on behalf of whom the candidate job has been scheduled. The manner in which the weighting factor (or "customer rating") may be implemented may depend entirely upon criteria set out in advance, such as customer loyalty, frequency of jobs submitted, promptness of payment, and may additionally include social factors such as ability of a customer to withstand potential economic loss resulting from cancellation of a scheduled print job. Preferably, where a customer rating exists for the requested job, its value is calculated in the same manner as a candidate job. Typically, for a given customer, the customer rating applied to requested jobs will be lower than that applied to candidate print jobs, reflecting the greater value attached to business which has already been commissioned, as compared with potential business.

Each candidate job may be either a single job or a plurality of individual jobs, each scheduled for commencement before the deadline, and which when aggregated are sufficiently large to provide a potential printing slot for the requested print job. In the event of a candidate print job comprising aggregated individual jobs the value of the candidate print job will preferably additionally be determined in accordance with an aggregation weighting factor which takes account of the greater potential for future loss as a result of cancelling orders for a plurality of customers rather than one.

In a further preferred embodiment, in the event that a requested job is of insufficiently high value to displace a candidate job from the schedule, the method further includes the steps of establishing a price at which the value of the requested job is sufficiently high to displace a candidate job. For example, where job value is defined commercially, this may be determined by increasing the price attributed to the requested job (and on the basis of which, inter alia, a monetary value is attributed to the requested job), performing the value comparisons with the or each candidate job using the increased price, and repeating this process until the price of the requested job is sufficiently high as to warrant cancelling a candidate job.

Prior to cancellation of a candidate job, a determination is preferably made of whether sufficient print media and/or maintenance life are available in respect of the or each printer on which a requested job is scheduled. Where necessary media and/or maintenance life which would become available in the event of cancellation of a candidate job may be taken into consideration.

The present invention is not limited to methods, and also encompasses apparatus. Accordingly a further aspect of the present invention provides a print allocation system including a database containing data relating to at least a deadline for printing a requested job, the monetary value of the job, and at least one data type relating to a technical aspect of the job, the system further comprising a print management programme adapted to:
 determine which of a plurality of printers are intrinsically capable of performing the requested print job by a requested deadline, and in the event no intrinsically capable printer is available to perform the requested job by the deadline:
  (a) retrieve data from the database relating to at least one candidate print job scheduled for commencement prior to the deadline;
  (b) allocate a value for each candidate print job in respect of which data is retrieved; and
  (c) in the event a candidate print job has a lower value than the requested job, cancel the lower value candidate job and schedule the requested job for completion by the deadline.

In a preferred form of the invention, prior to cancellation of a candidate job, the available maintenance life for the or each printer on which a requested job is to be performed may be checked to determine that sufficient maintenance life remains in order to perform the requested job. In establishing the remaining maintenance life, any available maintenance life which becomes available for the requested job as a result of cancellation of a candidate job may be taken into account. Similarly, and in a similar manner, the question of whether sufficient print media is available to perform the requested job is preferably taken into account prior to cancellation of a candidate job.

A further independent aspect of the present invention provides a method of scheduling maintenance for a printer comprising the steps of:

- determining whether, in accordance with at least one predetermined criterion, sufficient maintenance cycles are available on the printer to perform a requested print job;
- determining a total of maintenance cycles available subsequent to performance of the requested print job;
- determining whether the aforesaid total of subsequently available maintenance cycles is greater than a predetermined quantity;
- if the total of subsequently available maintenance cycles is less than the predetermined quantity, scheduling a maintenance job as a next job for the printer subsequent to performance of the requested job.

BRIEF DESCRIPTION OF DRAWINGS

Embodiments of the invention will now be described, by way of example, and with reference to the accompanying drawings, in which:

FIGS. 3A to F are respectively representations of the Job Schedule, Media Log, Maintenance Log, Customer Record, Printer Log and Finishing Log of FIG. 1;

FIG. 4 is a flowchart illustrating operation of the Job Store of FIGS. 1 and 2

FIG. 5 is a flow chart illustrating operation of the print allocation system according to the invention;

FIGS. 6 and 7 are flow charts illustrating the operation of the Media and Maintenance Loggers respectively;

DESCRIPTION OF PREFERRED EMBODIMENTS

Figures 1, 2:
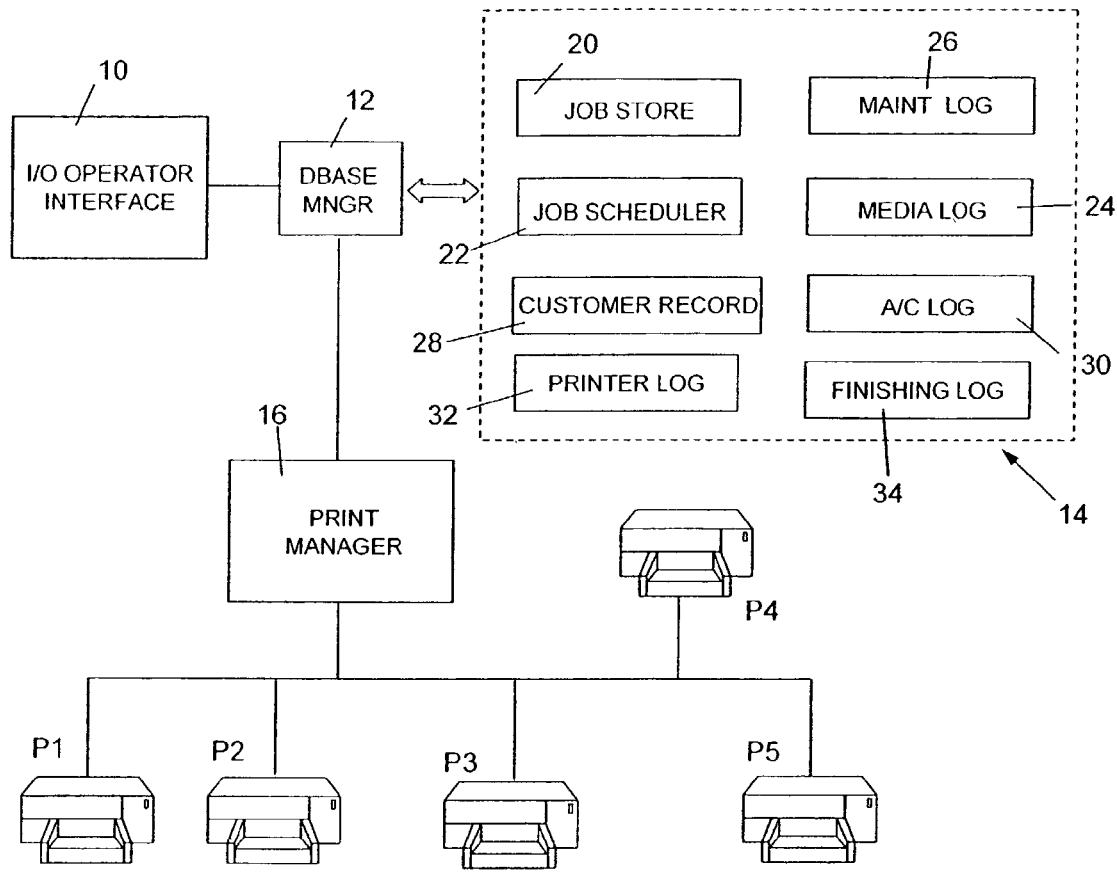
FIG. 1 is a schematic representation of a print allocation system according to an embodiment of the present invention.
FIG. 2 is a representation of the Job Store of FIG. 1.

Referring now to FIG. 1, a print allocation system includes an input/output interface 10 by means of which data (such as may be provided by a customer at the counter of a high-street print shop, for example) is entered into a data store, which in this illustrated example is a database, via a database management program 12, which updates each of the tables within the database 14, and retrieves data in response to requests from a print management and allocation program module 16. Typically this is provided by a suitably programmed PC or other desktop computer, and is connected to a network of printers P1 to P5. Other forms of data store may be employed as desired, such as for example the use of XML or other documents to store data for retrieval.

Referring now to FIG. 2 the Job Store 20 contains data relating to each requested print job, regardless of whether the job is ultimately accepted or refused. For each entry the Job Store includes a job number (denoted in the column "#"—in the illustrated example the most recently received job is number 05437); a customer ID, which is the same for all jobs requested by a given customer (e.g. in the first row of the Job Store the customer ID is "LFC111"); the print "MEDIA" required by the job, here 500 sheets of A4 Quality "1" paper, and 50% of a colour ("RGB") toner cartridges; a Job description under the header "JOB" in the table (here the typeface for job 05437 is Stemple Schneidler 8-point, and the job consists of 2 Gigabytes of text and 40 Megabytes of pictures); information on the Finishing required (for 05437 2-sided, and bound); the cash value of the job, i.e. the price of the job less the cost of the media (£25K for Job 05437); and finally status data. For Job 05437 the status is "U" meaning unallocated; the two other jobs for which data has been illustrated have status flags "P3;090801123300", meaning that the job has been scheduled for printer P3 on the $9^{th}$ Aug. 2001 at 12:33 and 00 seconds, and "DONE" indicating that the job has been processed. One other possible status is DEL, meaning that a Job has been cancelled (i.e. is refused having been scheduled) or rejected (refused without ever being scheduled in the first place).

The data in the Job Store, with the exception of the status data, that has been described is either entered by the print manager directly from information provided by the customer, typically in response to prompts from the user interface, or calculated from this information. The nature of the user interface is such that it ensures information necessary both to process a requested print job, and for enabling an assessment of the value (whether commercial or otherwise) of doing so is obtained from the customer, and that in the absence of such information the user interface simply raises an error flag to indicate complete information is required. The Cash value of a job is calculated by subtracting from a standard price for a job, calculated by the print manager in accordance with a number of predetermined criteria, the cost to the print service provider (as opposed to the rate at which they may be charged in calculating the job price) of the media required for the, which may in turn be determined from the "Media" and "Job" data in the Job Store.

In addition to the Job Store, the database contains the following further tables for each printer: the Job Schedule Log 22, the Media Log 24, the Maintenance Log 26. The database also contains a Customer Record table 28, and an Account Log 30 which self-evidently are independent of printer identity, a Printer Log 32, and a Finishing Log 34. These are represented schematically in tabular form in FIGS. 3A to 3F respectively. Each table provides data for one or more steps in the print allocation management process, and the tables will not be described further at this point.

Referring now to FIG. 4, once all of the requisite information relating to a newly requested job has been received at the user interface at step 402, the print manager operates to update the Job Store firstly by generating a new job number at step 404, and this is achieved simply by incrementing the most recently allocated job number by one, so that each requested job entered into the Job Store has an identifying number which is unique within the system. At step 406 the print manager determines whether the customer requesting the job is new, and if it is, at step 408 a new customer record is generated within the Customer Record table of the database, along with a customer ID. At step 410, following either step 406 or 408 the print manager calculates the cash value of the requested job (i.e. the standard price, less the cost of the specified media), and at step 412 the media required. At step 414 all the data relating to the job is saved in the Job Store, following which the routines ends. All data saved in the Job Store initially is given a default status of "U", and the status flag changes only upon either scheduling to a printer, completion, cancellation or rejection (these latter two states being indicated by "DEL").

Referring now to FIG. 5, a print allocation daemon is essentially a short continuously running program. At step 500 the daemon determines whether there are any Jobs of status "U" in the Job Store; if not the daemon goes to a holding step 502 and returns to step 500. If a job of unallocated status is in the Job Store, at step 504 the daemon calls a Job Scheduler function (described in detail with reference to FIG. 9), which either declines the requested job, or schedules the requested job depending upon the available space for the job and/or the value (in this example commercial value) of the requested job and any jobs already scheduled for the same time. If the job is rejected then at step 506 the Job Scheduler simply returns an appropriate value of "DEL" for the Job in the Job Store, and the daemon returns to step 500. If the job is accepted, the Job Scheduler returns a status value indicating the printer Pn and the time (DDM-MYYHHSS) of the job to the Job Store at step 508, and then simultaneously calls the Media Scheduler, Maintenance Scheduler, and Customer Record Update at steps 510 to 514 respectively. Following the completion of these routines, the daemon then returns to step 500.

Referring now to FIG. 6 the operation of the Media Scheduler programme following acceptance of a job by the Job Scheduler at step 508 is initiated at step 602 by a Job Scheduler update, that is to say an appropriate change of status (made by the Job Scheduler) to one of the Jobs in the Job Store. In this example a requested job in the Job Store has been accepted, and so the status has been changed from U to Pn;DDMMYYHUSS. At step 604 data relating to the "new Job", that is to say the job in respect of which the status has changed, is retrieved from the Job Store 20. At step 606, the paper requirement for the job is determined; in this example the paper requirement is determined by dividing the number of pages by a pagination factor (e.g. this is "2" for double-sided copies, since half as many pages are required), and then multiplying this by the number of copies required. Once the number of pages has been determined, the Media Log 24 for the printer on which the job has been scheduled is updated at step 608, to amend the scheduled useage of the size and type of paper concerned. Referring once again to FIG. 3B, this simply involves adding the product of the calculation from step 606 to the number under the heading "SCH. USEAGE" in the tabular representation of the Media Log. At step 610, the paper available subsequent to performance of the requested job "AVL STOCK" is calculated, and this is given by subtracting the scheduled useage from the paper in stock ("LVS IN STOCK"), which is the amount of paper delivered at the commencement of a "paper budgeting" period. This is because the present system takes no account of the difference between scheduled paper useage and actual useage. Step 612 determines whether the available stock is greater than a predetermined quantity known as the QBUFFER. The QBUFFER is determined as desired, and may for example be equal to twice the average media (whether paper, toner or whatever) for the average-sized job on the printer in question. If the available stock is greater than the QBUFFER, then the programme skips through steps 614 and 616, which in the presently described example serve no function (since there is no BUFFER to delete, and no "order" to cancel) and the programme ends. If as a result of a update from the Job Scheduler the available stock falls below the value QBUFFER, then at step 618 a variable BUFFER is initialised (in the event that this is the first time in this media ordering cycle that the available stock has fallen below the level of QBUFFER), or updated (if the variable BUFFER has already been initialised), and is set equal to the available stock. At step 620 the programme determines whether an order for more stock has been placed (since if the available stock was already below the QBUFFER level when the present Job Scheduler update occurred, an order will have been placed; and if not, it won't). If an order for more media has been placed, then the programme ends, if no order has been placed, then at step 622 an order is placed and the programme ends.

Thus far, operation of the Media Logger programme has been described using the example of an update from the Job Scheduler in which a job is accepted and scheduled, i.e. the status changes from U to Pn; DDMMYYHHSS. The Media Logger programme is however also responsive to another form of status change, viz a change from a scheduled status to a deleted status, either because the Job Scheduler has cancelled a job previously scheduled in favour of another requested job, or because the customer has cancelled a scheduled job. In the event of such a status change, the same routine applies, with appropriate modifications being made to the Media Log by virtue of the algebraic summation. Thus in the event a status change from Pn; DDMMYYHHSS to DEL, the paper requirement calculated in step 606 has a negative sign, and so when subtracted from the scheduled paper useage is actually added to it, to take account of paper which is no longer required. The consequent increase in the available stock will thus also increase the value of BUFFER as a result of a job cancellation. However, in the event of an increase in the available stock to from a level lower than QBUFFER prior to a cancellation, to a level which is subsequently greater step 612 routes the programme via steps 614 and 616 which then take effect to cancel the BUFFER and any existing order for media.

It is emphasised that in this illustrated embodiment the processes of the Media Logger relate to actions taken after a requested job is scheduled. The media Logger thus has no role in determining whether sufficient media are available to perform the job, this process being performed by the job scheduler, as will be described later.

The above-described Media Logger programme relates to paper; similar programmes are typically applied to deal with any other print media such as toner for example.

A Maintenance Logger programme is illustrated schematically in FIG. 7, and in this example deals with the maintenance of a roller within a given printer. The programme is similar in operation to that of the Media Logger programme, and is initiated at step 702 by an update from the Job Scheduler following which the job data is retrieved at step 704. The number of roller cycles for the job is calculated at step 706, in this instance being the product of the number of pages in the job, the pagination factor (since a double-sided print requires twice as many roller operations as two single-sided prints—as a result of the operation of the printer to which the Maintenance Logger relates), and the number of copies, following which the "scheduled roller cycles" is updated in the Maintenance Log at step 708. The remaining cycles which the roller is capable of performing before maintenance is required following performance of the requested job ("CYCLESFREE") is then calculated at step 710 as being the difference between the intrinsic maintenance lifetime cycle of the roller, and the number of cycles the roller is scheduled to perform. At step 712 the programme determines whether the quantity CYCLESFREE is greater than a predetermined amount PBUFFER, analogous to QBUFFER in connection with FIG. 6. If CYCLESFREE is greater than PBUFFER, then the programme proceeds via steps 714 and 716. These steps may apply in the event of an update from the Job Scheduler cancelling a job and will be described in more detail subsequently. If the CYCLESFREE is less than PBUFFER, then a variable BUFFER is either initialised (in the event this is the first time within this maintenance cycle that CYCLESFREE has fallen below PBUFFER), or updated (if the variable BUFFER has already been updated) at step 718 and set equal to remaining available cycles CYCLESFREE, and at step 720 a maintenance job is scheduled in the Job Scheduler (which in this instance is replacement of the roller), following which the programme ends.

Figure 8A:
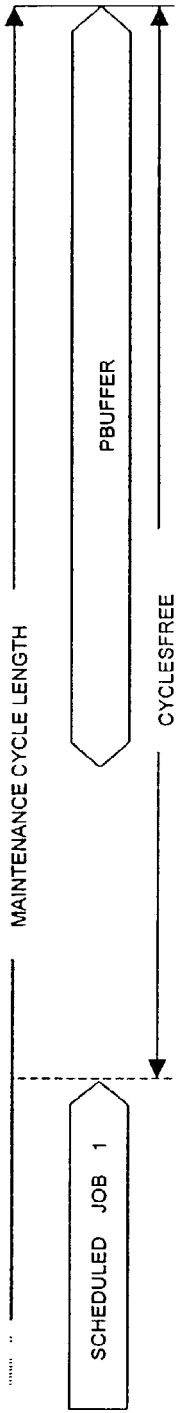
FIGS. 8A to C are schematic representations of the scheduling of a maintenance job by the Job Scheduler and Maintenance Logger of FIGS. 5 and 7 respectively.
Figure 8B:
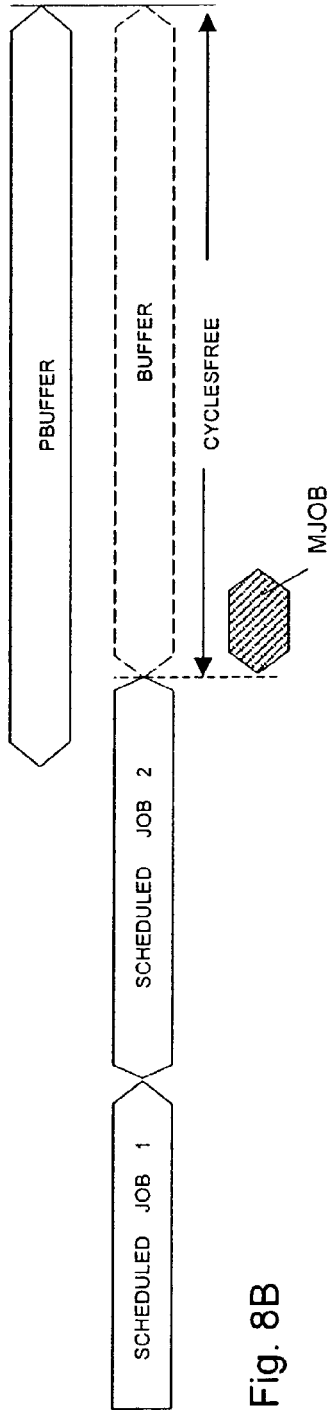
Figure 8C:
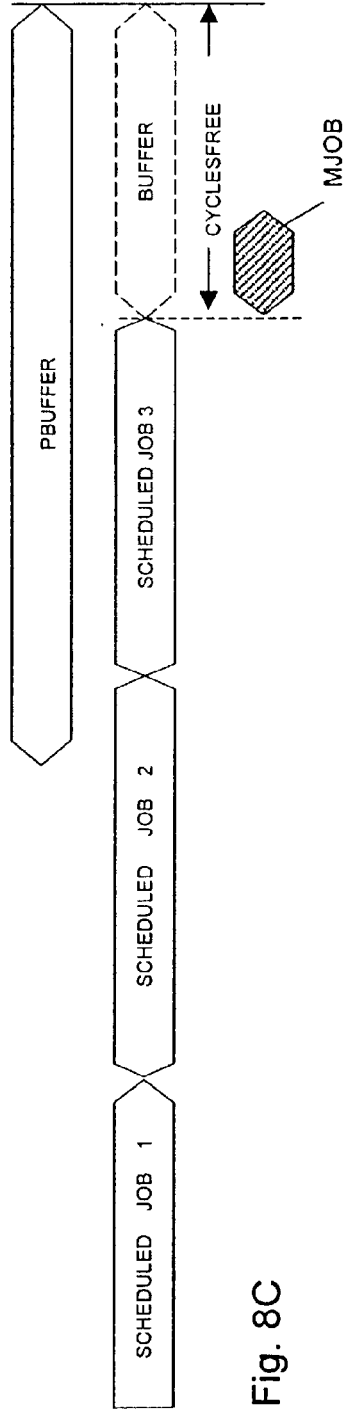

The step 720 of scheduling a maintenance job is associated with a small programme which always moves the maintenance job to a position immediately after the last scheduled print job. Referring now to FIG. 8A, following performance of a first scheduled job it can be seen that the remaining cycles before maintenance (i.e. CYCLESFREE) is greater than the quantity PBUFFER. Referring to FIG. 8B, after a second scheduled job, the CYCLESFREE has fallen below the level of the PBUFFER, and so a maintenance job MJOB is scheduled, and the variable BUFFER is initialised. Referring now to FIG. 8C, a third job is then scheduled, this being permitted by the Job Scheduler because the cycles required by the third job is smaller than the BUFFER, and the self scheduling programme with which the maintenance job is wrapped then operates to cancel the existing maintenance job and to reschedule the maintenance job to a time immediately after the third scheduled job. Thus as the buffer (which in FIGS. 8B and 8C is equal to the number of remaining available maintenance cycles before the roller needs replacement) decreases in size, the maintenance job MJOB is moved nearer to the end of the life of the roller, with the result that, where the roller is still capable of performing the cycles required by a requested job, no job is declined in favour of a maintenance job. Operation of the Job Scheduler, which will subsequently be described, prevents the scheduling of a job which requires more cycles than are available (i.e. in the BUFFER) before the performance of a maintenance job.

As with the case of the Media Logger programme, the Maintenance Logger is also responsive to changes of status in which a job is cancelled by the Job Scheduler, and as previously deals with these using algebraic summation to update the scheduled roller cycles, the CYCLESFREE and the BUFFER. Because, as described in detail above, the maintenance job is self-scheduling, if a job is cancelled, the maintenance job will reschedule itself to a time immediately following the previous "last scheduled job". In the event that cancellation of a job causes the CYCLESFREE to exceed the PBUFFER once again, having previously been smaller than PBUFFER, then following positive outcome to decision step 712, steps 714 and 716 cause deletion of the BUFFER variable and cancellation of any existing maintenance job, prior to ending of the programme.

Figure 9:
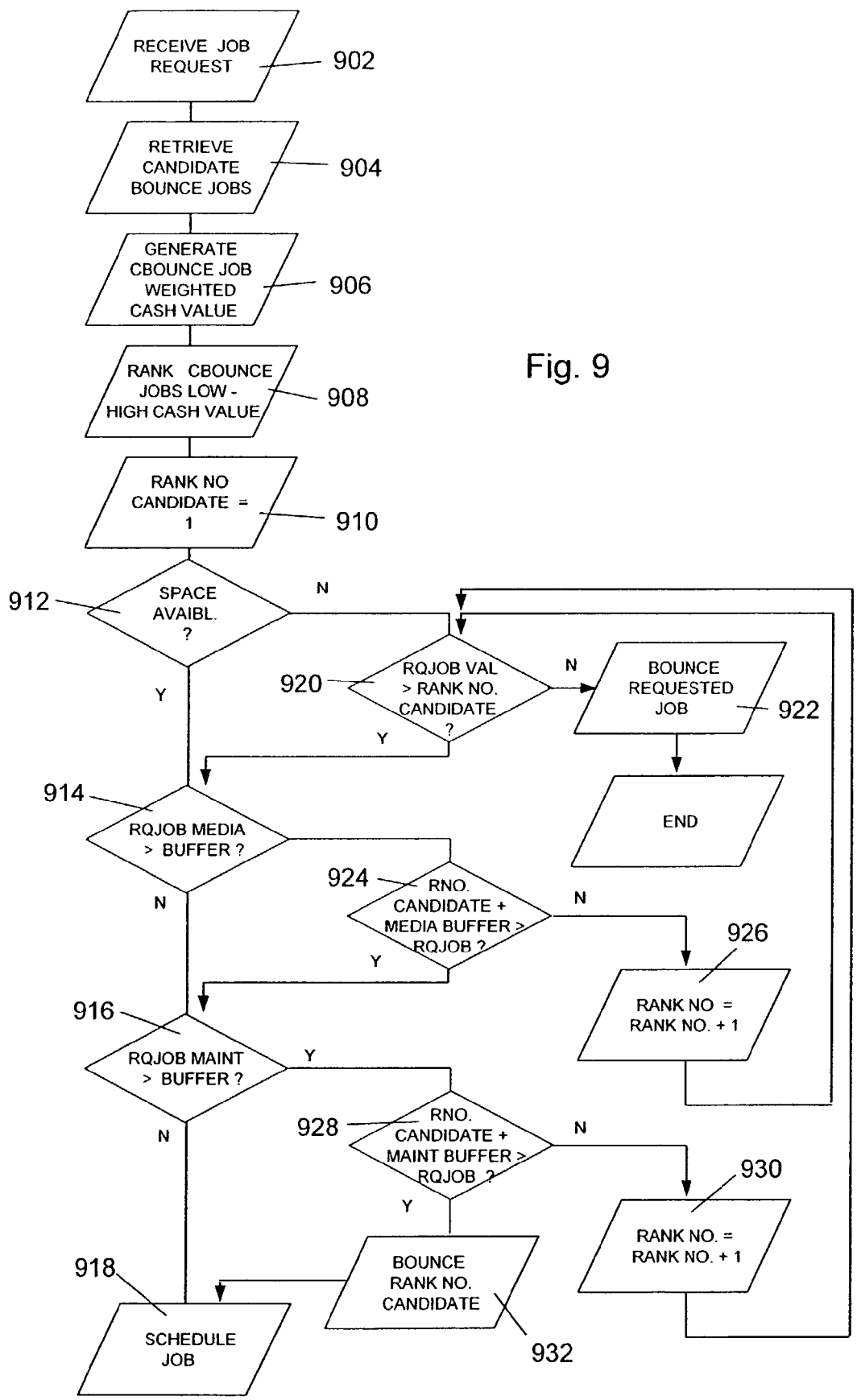
FIG. 9 is a flowchart illustrating the operation of the Job Scheduler of the system of FIG. 5.

Referring now to FIG. 9, operation of the Job Scheduler will now be described. The process is initiated by an update to the Job Store at step 902 in which a job is entered having a status U. At step 904 the programme retrieves scheduled print jobs (i.e. their job number) which are candidates to be cancelled, or "bounced" in favour of the requested print job with the U status. Candidate jobs are selected on the basis of a number of criteria, a predominant one being those jobs which are scheduled for performance on a printer which is intrinsically capable of performing the requested print job, and so candidates are retrieved from the Job Schedules 22 (see FIG. 3A) for each intrinsically capable printer. In one embodiment all candidate jobs are individual jobs and so must be scheduled to start at a time which (1) is prior to the delivery deadline specified in the Job Store, and (2) precedes the delivery deadline by a sufficiently large time interval to enable the requested job to be performed in the time interval between the scheduled start time of the candidate print job and the delivery deadline of the requested print job. In an alternative embodiment, one or more individual jobs may be aggregated to create candidate print jobs of sufficient size, such that cancellation of the candidate job would provide a large enough time interval to perform the requested job, while in a further modification, one or more requested jobs my correspondingly be aggregated. Following retrieval of all candidate print jobs, at step 906 the Job Scheduler generates a weighted cash value for each candidate. This involves firstly the retrieval of the cash value of each candidate from the Job Store, and then the weighting of the cash value in accordance with the customer rating factor. The customer rating factor is determined in each case instantaneously on the basis of the information in the customer record, such as the number of jobs requested by the customer, the size of the requested jobs, the cash value of the requested jobs and the promptness of payment for the jobs; in other words, factors which determine how good a given customer is, and how damaging loss of such a customer might be in the event the customer takes their business elsewhere as a result of cancellation of a scheduled print job. In the case of candidate jobs which are aggregated from individual jobs, a further aggregating weighting factor is used to account for the possible loss of one or other or both customer's business resulting from the cancellation of a candidate scheduled job, since loss of a customer is more likely if two customers are "snubbed", rather than one. After the weighted cash value for the candidate jobs has been generated, the candidates are then ranked from lowest to highest weighted cash value at step 908, and at step 910 a variable RANK NO CANDIDATE is initialised at "1", which effectively assigns the lowest ranked candidate to that variable.

A weighted cash value for the requested job is also generated in the case of a job requested by an existing customer, and for which there is a customer rating, although the weighting is inherently lower than for the candidate jobs, since these are "existing" jobs which have already been scheduled, and the lower weighting for requested jobs reflects this commercial "inertia" in favour of an existing job. This lower weighting for requested jobs than candidate jobs may be implemented for example either by having a system in which for each customer there are two ratings: one for candidate jobs, and a lower one for requested jobs, or alternatively, a single customer rating may be used, and an additional weighting factor used to differentiate between the two different types of job.

Although, in the present embodiment, the purpose of attributing weighted cash values to jobs is to determine whether, from a commercial standpoint, cancellation of one job in favour of another is an advantageous course of action, and although in the majority of cases commercial advantage equates directly to pecuniary advantage, the use of cash values (or values directly relating to cash or other pecuniary units) is not necessary for performance of the invention, and "value" may be represented in any convenient manner. Further, the weighting scheme described above are is not necessary for performance of the invention. Additionally, in the event that weightings are employed, it is not necessary to employ a weighting scheme of the type described above;

the weighting scheme may be entirely different to reflect different commercial, altruistic or other objectives as the case may be.

Referring again to FIG. 9, at step 912, the Job Scheduler determines whether there is scheduling space available to perform the requested job i.e. whether there is time available on any of the intrinsically suitable printers. If there is then at step 914 the Job Scheduler determines whether the requested job is greater than the Media BUFFER, i.e. whether the requested job requires more media than is defined as being available. If the answer is no then the Job Scheduler progresses to step 916, at which it determines whether the requested job has requirements which exceed the Maintenance BUFFER. As with step 914, if the answer is no then the Job Scheduler schedules the job at step 918 by returning an appropriate Pn:DDMMYYHHSS value to the Job Store 20 and the programme ends. It is thus apparent that in the event there is scheduling space, and sufficient Media and Maintenance life within appropriate printers, the steps of retrieving candidate print jobs, generating weighted cash values for them, and ranking them is unnecessary, even though these steps are performed as a matter of course. However, performance of these processes at this point in the programme greatly simplifies the programme in the event that scheduling space, Media or Maintenance cycles are insufficient to schedule the job directly.

In the present example determination of sufficient scheduling space is limited to whether a given requested job may be performed on a given (intrinsically capable) printer. It is however possible to consider whether sufficient scheduling space exists from an aggregate of available scheduling space in a plurality of individual (intrinsically capable) printers; in this case a requested job for which there is sufficient scheduling space may be performed by dispatching the job to a plurality of different printers.

Returning to step 912, in the event that there is insufficient scheduling space on a given printer, the programme determines at step 920, whether the cash value (weighted or otherwise) of the requested job is greater than the weighted cash value of the RANK NO CANDIDATE, i.e. the lowest ranked (and therefore having the lowest weighted cash value) candidate print job. If it is not, then the requested print job is bounced (i.e. refused) at step 922 by returning the status DEL to the job store for the requested job, and the programme ends. If the requested job has a greater cash value than the weighted cash value of the RANK NO CANDIDATE, then it is deemed to be economically advantageous to accept the job, subject to whether there is sufficient media and Maintenance life to do so. Thus if the requested job has a greater cash value, at step 914 the programme determines whether there is sufficient Media available (as described above). If there is not, then at step 924, the programme determines whether the media remaining within the Media Buffer together with the media required by the RANK NO CANDIDATE is greater than the media required by the requested job, since if the RANK NO CANDIDATE is bounced then the media it required will once again become available by virtue of the algebraic summation within the Media Logger of FIG. 6. If the combination of the Media BUFFER and the media effectively liberated in the event of cancellation of the RANK NO CANDIDATE is sufficient to enable performance of the requested job, then the programme progresses to step 916 to determine whether the requested job has requirements exceeding the Maintenance BUFFER. If on the other hand the requested job's media requirements are still too great to be met by the combination of the Media BUFFER and cancellation of the RANK NO CANDIDATE, then at step 926 the programme operates to determine whether the cancellation of the next highest ranked candidate print job will provide the necessary media in combination with the Media BUFFER, by augmenting the RANK NO CANDIDATE by 1 and thus assigning this variable to the next highest ranked candidate print job. Having done this the programme returns to step 920, since the fundamental criterion of economic advantage must still be met in order to warrant cancellation of any candidate print job in favour of a requested print job. Thus in order to reach the stage of determining whether cancellation of the new RANK NO CANDIDATE will provide sufficient Media to enable the requested job to go ahead, it must first be established that the weighted cash value of the new RANK NO CANDIDATE is less than that of the requested job. If at any iteration of the job scheduler programme this question is answered in the negative the requested job is refused and the programme ends.

If at step 916, following either a successful outcome to step 914, or step 924, the programme determines that the requested job has requirements which are greater than the Maintenance BUFFER, then at step 928 the programme determines whether, in combination, the RANK NO CANDIDATE and the Maintenance BUFFER can provide sufficient maintenance life to enable the requested job to proceed. If not then at step 930 the RANK NO CANDIDATE is augmented by 1, and the programme then returns to step 920 to proceed with the economic viability test. If in combination the Maintenance BUFFER and RANK NO CANDIDATE provide sufficient maintenance life to schedule the requested job, then at step 932 the RANK NO CANDIDATE is cancelled (or "bounced") by changing it's status in the Job Store 20 to DEL, and deleting if from the Job Schedule 22.

In the present embodiment the Job Scheduler thus only schedules a requested job, if, in the event that there is insufficient scheduling space, a candidate print job for cancellation is economically less worth processing, and if, once the effects of cancellation of a candidate print job are taken into account, there is sufficient Media and Maintenance life to perform the requested job. Thus if a requested job is refused it may be that there are candidate print jobs of lesser economic value which could be cancelled, but that media and maintenance constraints mean cancellation of a candidate print job having a higher economic value would be necessary in order to be able to schedule the job, which is obviously not advantageous. In accordance with the job scheduler programme, sufficient available Media/Maintenance life is defined as a requested job having Media/Maintenance requirement less than or equal to the Q/PBUFFER in combination with any Media/Maintenance liberated as a result of cancellation of a candidate job. It is thus possible a requested job may be refused for lack of Media/Maintenance life even though there are sufficient available Media/Maintenance cycles to perform the requested job. This policy is deliberately chosen so that no single scheduled job is so large as to dominate too much scheduling space, Media and Maintenance life, which could otherwise result in refusal of many smaller subsequent jobs purely by virtue of size. The size of the largest potential job under this policy is thus determined by the size of the QBUFFER and PBUFFER. In an alternative embodiment the policy could be amended so that the test is whether the requested job exceeds available media or maintenance life.

Figure 10:
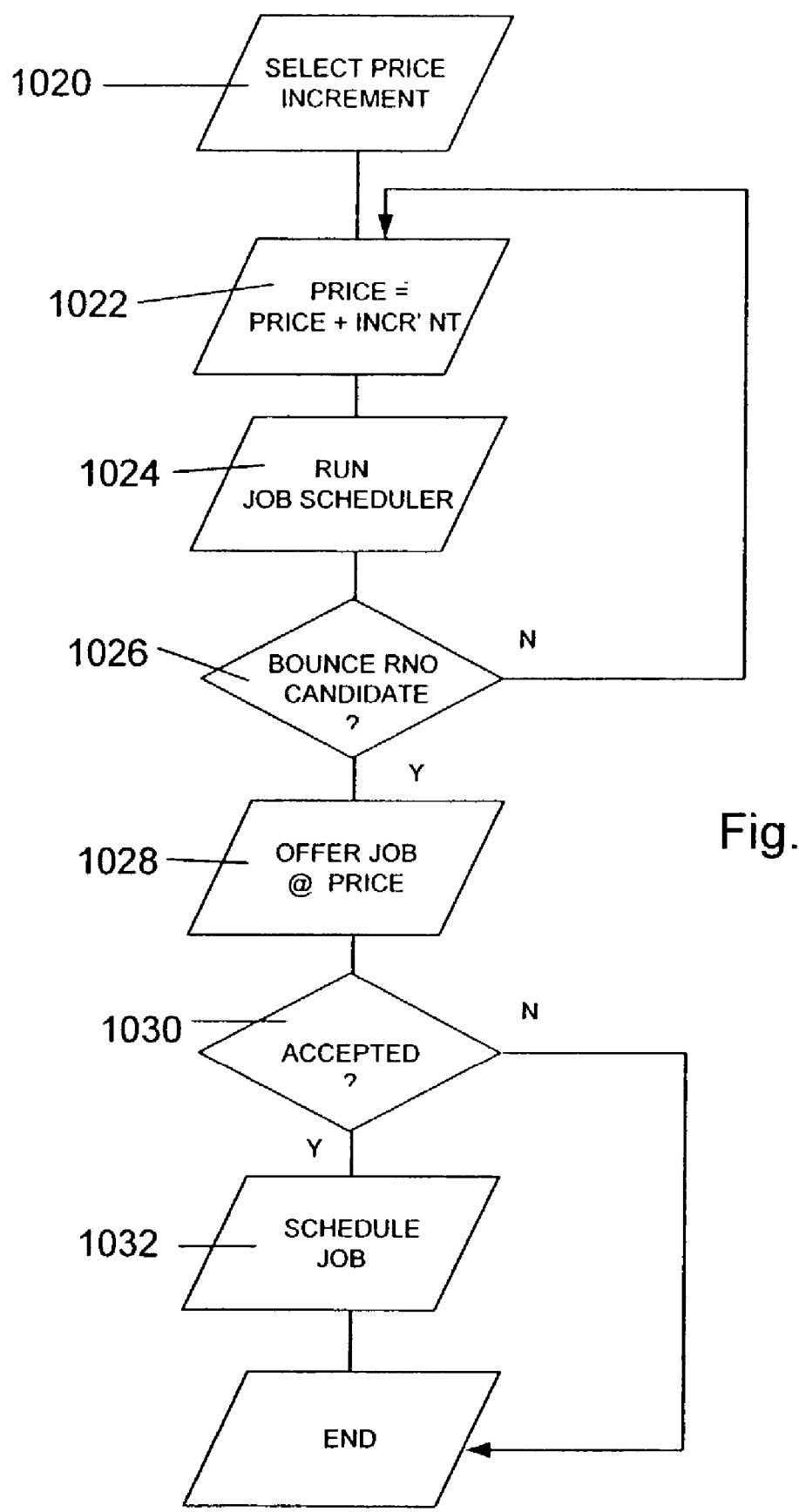
FIG. 10 is a flowchart illustrating the operation of a bidding module running in conjunction with the Job Scheduler of FIG. 8.

Referring now to FIG. 10, in a scenario where a requested job is refused in favour of the candidate print jobs already scheduled, it may be advantageous to be able to provide a customer with a price for a requested print job at which it becomes economically viable to perform the job. What is essentially an automated bidding routine starts, typically as a result of a rejection following running of the Job Scheduler, at step 1020 with the selection of an increment price.

Typically this will be in proportion to the overall standard price of the requested job, so that for a requested job having a low standard price the increment price is small, and vice versa. At step 1022 the standard price is incremented by the price increment, and the Job Scheduler is then run at step 1024. If the requested job is not scheduled at the incremented price to cause bouncing of a RANK NO CANDIDATE, then at step 1026 the process returns to step 1022 and the price is once again incremented, following which the Job Scheduler is run once again. Once the price has been augmented to a level sufficient to cause a RANK NO CANDIDATE to be cancelled in favour of the requested print job, then at step 1028 the customer is offered the opportunity to have the job scheduled at the augmented price. At step 1030 the customer then either agrees or refuses, resulting either in scheduling of the requested print job and cancellation of the RANK NO CANDIDATE at 1032 whereupon the programme ends, or the programme ends directly.

In a modification the Job Store is periodically scanned for completed and scheduled jobs belonging to individual customers, in order to forecast inflow of future jobs. Forecasts of future jobs not yet received from such customers, and which can be made with a predetermined level of confidence (e.g. on the basis of a predetermined volume of historical data) are then scheduled as "virtual jobs" in the Job Store 20, and have the same status vis-à-vis requested jobs as real scheduled jobs. In a further modification, virtual jobs may be scheduled based upon relatively low confidence levels that a real job of this nature will occur in the future, and a weighting corresponding to the probability that a virtual job will become a real job may be used to reflect the confidence level, typically by weighting the value of the virtual job accordingly. The result of such a system is that jobs which are least likely to materialise into genuine jobs are most likely to be bounced in favour of a subsequently requested job.

The creation of virtual jobs additionally has further uses, one of which, in accordance with a further independent aspect of the present invention, provides for optimisation of purchasing decisions with regard to hardware requirements, and in particular printers and/or finishing devices. Referring now to FIGS. 3E and F, the Printer and Finishing Logs contain data on the intrinsic capability of Printers and Finishing devices respectively. Thus the Printer Log 32 includes the identity of the printer; the speed at which the printer is capable of printing; the different sizes of paper that the printer is able to process; the media capacity (here in terms of the number of leaves of paper and toner cartridges that may be loaded at one time); whether the printer is capable of performing colour printing; the pagination capability, i.e. single or double sided for example; and finally a cost rating, which is an indication of the capital value of the printer and the running cost (e.g. in terms of maintenance and electricity, for example) to the business of using the printer. The Finishing Log likewise includes an identity category; the printers with which the finishing device is compatible, which therefore simply lists one or more IDs of compatible printers; whether the finishing device in question is capable of binding the printed documents; its capacity in terms of document size; and finally a cost rating, which serves the same function as the printer cost rating.

Figure 11:
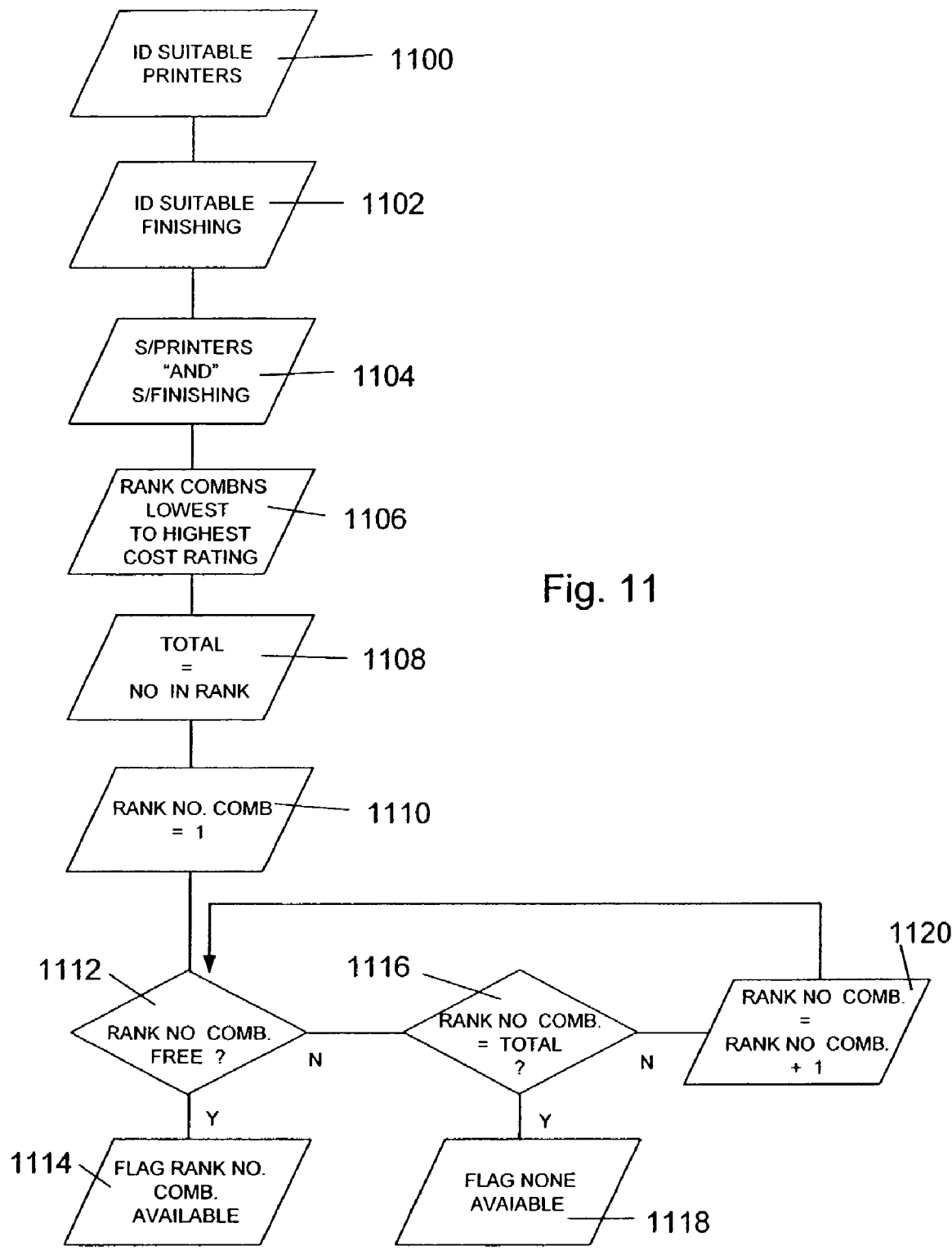
FIG. 11 is a flowchart illustrating operation of an element of the flowchart of FIG. 9.

These parts of the database are primarily used in performing the decision step 912 of the Job Scheduler programme in FIG. 9, and this step is illustrated in more detail in FIG. 11. Referring now to FIG. 11, all printers intrinsically suitable for performing the job are identified in step 1100. This step involves matching the "MEDIA" data from the Job Store 20 to the "Paper Sizes" and "Media Capacity" of printers from the Printer Log 32; the "JOB" and "DELIVERY" data from the Job Store to the "Speed" and "Colour" capability of printers in the Log, and "FINISHING" data from the Job Store to the "Pagination" from the Printer Log. In step 1102, suitable finishing devices are identified in a similar manner, by matching elements from the "FINISHING" data in the Job Store to "Binding" in the Finishing Log, and elements of the "JOB" data to the "Capacity" data in the Finishing Log. In step 1104, those of the identified suitable printers and finishing devices which are compatible with each other are then identified (i.e. the boolean AND of the products of steps 100 and 1102), and are then ranked from lowest to highest in accordance with their net cost rating in step 1106. In step 1108 the variable TOTAL is initialised, this being simply the total number of ranked combinations, and subsequently serving to provide a cap on the number of iterations the programme performs. At step 1110, the variable RANK NO. COMB is set at "1", which simply assigns that variable to the lowest cost rating combination. At step 1112 a decision is taken as to whether the RANK NO COMB is available to perform the requested job, and this is determined by searching the Job Scheduler for the printer in question (and Finishing device—although this log has not been illustrated) to determine whether it is free for a sufficient period of time prior to the delivery date specified in the Job Store in order to perform the requested job, having regard to the speed at which the printer may operate (NB this is not simply a reiteration of matching the "DELIVERY" data from the Job Store to the "Speed" of the printer performed in step 1100, because that step took no account of other commitments which the printer may be required to fulfil during the period prior to the delivery date). If the printer and finishing device are available to perform the job then the programme returns an available flag for that combination at step 1114, which is in effect a "yes" answer to the decision step 912. If however that RANK NO COMB are not available, then at step 1116 the programme determines whether the RANK NO COMB is equal to the variable TOTAL, i.e. whether all of the ranked combinations have been considered. If the answer to this is yes, then at step 1118 the programme returns an unavailable flag (which is effectively a "no" answer to decision step 912), since all of the ranked combinations have been considered, and none of them are available to perform the requested job. If all of the ranked combinations have yet to be considered (i.e. RANK NO COMB is less than TOTAL) then at step 1120 the variable RANK NO COMB is assigned to the next highest cost rated combination of printer and finishing device, and the programme returns to step 1112. This part of the Job Scheduler programme thus seeks to allocate a job to the lowest cost rated combination of printer and finishing device available.

A modified form of this function from the Job Scheduler programme may also be used to forecast future requirements for printers and/or finishing devices for example. As with the standard function, the modified function determines whether printer/finishing combinations are available to perform jobs. The modification to the function is that in the case of virtual jobs (i.e. those predicted for the future), at step 1112, in the event that a particular RANK NO COMB is not available to perform a virtual job, this is recorded, preferably with the printer and finishing device data of the combination being stored separately. A variable is assigned for each printer and for each finishing device, and the variable is augmented by one each time they are unavailable to perform a virtual job for which they would have been suitable; the variable is therefore equal to the total number of occasions on which they have been unavailable to perform a job predicted to occur. According to one embodiment, once this variable reaches a predetermined threshold for a given hardware item, a flag is raised indicating that more hardware of this type is required. If desired this variable may be reset to zero at periodic intervals so that a flag is only raised if the frequency of demand exceeds a predetermined level, as opposed to aggregate demand over time.

Thus this aspect of the present invention provides a method of managing procurement of print hardware comprising the steps of establishing a probability of a job of a specified nature occurring in the future; on the basis of the probability, scheduling a virtual job in future for performance by a given print hardware device; and monitoring demand for a given print hardware device on the basis of frequency of virtual jobs scheduled therefor, and procuring further print hardware when the demand exceeds a given level.

The invention claimed is:

1. A method of managing print services comprising:
   identifying, from a plurality of printers, at least one printer intrinsically capable of performing a requested print job by a requested deadline,
   determining whether sufficient scheduling space is available on the at least one intrinsically capable printers to perform the requested job by the deadline, and
   in the event sufficient scheduling space is not available:
   (a) retrieving data relating to at least one candidate print job scheduled for commencement on one of the at least one intrinsically capable printers prior to the deadline;
   (b) allocating a value for each of the at least one candidate print job in respect of which data is retrieved;
   (c) in the event a candidate print job has a lower value than the requested job, cancelling the lower value candidate job and scheduling the requested job for completion by the deadline; and
   (d) in the event all candidate print jobs have a higher value than the requested job, establishing at what price the requested job has a higher value than at least one candidate print job.

2. A method according to claim 1 wherein each candidate print job is an individual print job, and only a single candidate print job is cancelled in favour of the requested job.

3. A method according to claim 1 further comprising the steps, performed in the event all candidate print jobs have a higher value than the requested job, of:
   (d) increasing the price of the requested job;
   (e) determining whether a candidate print job has a lower value than the requested job;
   (f) in the event all candidate print jobs have a higher value than the requested job, repeating steps (d) and (e) until a price for the requested job is reached at which a candidate print job has a lower value than the requested print job.

4. A method according to claim 1 additionally comprising the step of determining whether sufficient print media are available to perform the requested job.

5. A method according to claim 4 wherein determination of sufficiency of available print media takes into account any print media which, in the event of cancellation of a candidate job, would become available as a result of the aforesaid cancellation to perform the requested job.

6. A method according to claim 1, further comprising the step of determining whether sufficient maintenance life remains on a given printer to perform the requested job.

7. A method according to claim 6 wherein determination of sufficient maintenance life takes into account any maintenance life which, in the event of cancellation of a candidate job, would become available as a result of the aforesaid cancellation to perform the requested job.

8. A method of managing print services comprising:
   identifying, from a plurality of printers, at least one printer intrinsically capable of performing a requested print job by a requested deadline,
   determining whether sufficient scheduling space is available on the at least one intrinsically capable printers to perform the requested job by the deadline, and
   in the event sufficient scheduling space is not available:
   (a) retrieving data relating to at least one candidate print job scheduled for commencement on one of the at least one intrinsically capable printers prior to the deadline, wherein at least one candidate print job is aggregated from two individual print jobs scheduled for commencement before the deadline, and the value of the aggregated candidate print job is calculated from the values of the individual print jobs;
   (b) allocating a value for each of the at least one candidate print job in respect of which data is retrieved; and
   (c) in the event a candidate print job has a lower value than the requested job, canceling the lower value candidate job and scheduling the requested job for completion by the deadline.

9. A method according to claim 8 wherein the value of a job is determined at least on the basis of the price of the job to the customer, the costs of performing the requested print job, and a customer rating determined individually for the job's customer, and wherein the value of an aggregated candidate print job is additionally determined on the basis of an aggregating factor.

10. A method according to claim 9 wherein the aggregating factor takes account of an increased commercial risk from the cancellation of a plurality of candidate jobs when compared with the commercial risk from the cancellation of a single job.

11. A method of managing print services comprising:
    identifying, from a plurality of printers, at least one printer intrinsically capable of performing a requested print job by a requested deadline,
    determining whether sufficient scheduling space is available on the at least one intrinsically capable printers to perform the requested job by the deadline, and
    in the event sufficient scheduling space is not available:
    (a) retrieving data relating to at least one candidate print job scheduled for commencement on one of the at least one intrinsically capable printers prior to the deadline;
    (b) allocating a value for each of the at least one candidate print job in respect of which data is retrieved, wherein the value of each job is determined at least on the basis of the price of the job to the customer, at least one cost of performing the requested print job, and a customer rating determined individually for the job's customer; and
    (c) in the event a candidate print job has a lower value than the requested job, canceling the lower value candidate job and scheduling the requested job for completion by the deadline.

12. A method according to claim 11 wherein the customer rating is determined at least on the basis of the frequency and value of jobs previously requested by a customer.

13. A method according to claim 11, wherein, for a given customer rating, requested jobs are inherently weighted by a lower factor than candidate jobs.

14. A print services provision management system having a data store containing data relating to (a) at least print jobs scheduled for performance and (b) customers requesting jobs; and a print management programme adapted, in response to a request to perform a print service by a deadline, to:
- determine which of a plurality of printers are intrinsically capable of performing the print service;
- retrieve from the data store data relating to at least one candidate print job scheduled for commencement prior to the deadline on at least one intrinsically capable printer;
- aggregate the candidate job from a plurality of individual jobs, all of which are scheduled for commencement prior to the deadline on at least one intrinsically capable printer; and
- schedule the print service in preference to the candidate job if the print service's commercial value is higher than that of the candidate job.

15. A system according to claim 14 wherein the print management programme is adapted to determine whether sufficient print media is available to perform the print service.

16. A system according to claim 15 wherein, in the step of determining whether sufficient print media is available the print management programme takes into account print media made available as a result of cancellation of a candidate job.

17. A system according to claim 14 wherein the print management programme is further adapted to determine whether sufficient maintenance life is available on an intrinsically capable printer to perform the print service.

18. A system according to claim 17 wherein in the step of determining whether sufficient maintenance life is available, the print management programme is additionally adapted to take into account any maintenance life made available by cancellation of a candidate job.

19. A system according to claim 14 wherein if a print service's commercial value is not higher than any candidate job, the print management programme is additionally adapted to:
- (i) increase the value of the print service;
- (ii) determine whether the increased value of the print service is higher than the at least one candidate job;
- (iii) if, following the increase in the value of the print service, the print service's value higher than that of at least one candidate job, offer to a customer performance of the print service at an increased price related to the increased value; or
- (iv) if following the increase in the value of the print service, the print service's value is lower than that of the at least one candidate job, repeat steps (i) and (ii) above until the print service's value is higher than that of the candidate job.

20. A print allocation system including a data store containing data relating to at least a deadline for printing a requested job, the monetary value of the job, and at least one data type relating to a technical aspect of the job, the system further comprising a print management programme adapted to:
- determine which of a plurality of printers are intrinsically capable of performing the requested print job by a requested deadline;
- create a candidate print job from a plurality of individual jobs each scheduled for commencement prior to the deadline; and
- in the event no intrinsically capable printer is available to perform the requested job by the deadline:
  - (a) retrieve data from the data store relating to at least one candidate print job scheduled for commencement prior to the deadline;
  - (b) allocate a value for each candidate print job in respect of which data is retrieved; and
  - (c) in the event a candidate print job has a lower value than the requested job, cancel the lower value candidate job and schedule the requested job for completion by the deadline.

21. A system according to claim 20 wherein the print management programme is additionally adapted to determine whether sufficient print media are available in order to perform the requested print job.

22. A system according to claim 20 wherein the print management programme is additionally adapted to determine whether sufficient maintenance life is available on a printer to perform the requested print service.

23. A system for allocating performance of print services among a plurality of printers, the system comprising:
- means for storing data related to each of the plurality of printers;
- means for receiving data from a customer relating to a requested print job;
- means for determining which of the plurality of printers are inherently capable of performing the requested print job;
- means for identifying, if there is insufficient scheduling space available on at least one inherently capable printer to perform the requested print job by its deadline, candidate print jobs scheduled for commencement on at least one inherently capable printer prior to the deadline;
- means for determining whether the requested job has a greater value than a candidate print job; and
- means for determining at what price the requested print job has a greater value than at least one candidate print job.

24. A system according to claim 23 further comprising means for determining whether sufficient print media and/or maintenance life are available to perform the requested service.

25. A method of managing provision of print services comprising:
- determining whether sufficient capacity exists within a defined set of printing hardware to perform a requested job, having regard to the hardware's intrinsic capability and any prior print job commitments;
- if sufficient capacity does not exist, selecting at least one candidate print job scheduled for performance on the hardware, and cancellation of which would provide sufficient capacity to perform the requested job;
- comparing values of the requested job and each candidate job;
- if the requested job has a lower value than each candidate job, augmenting the value of the requested job until it has a higher value than at least one of the candidate jobs; and
- offering a contract to perform the requested job at the higher value.

26. A method according to claim 25 wherein at least one of the candidate jobs is aggregated from a plurality of jobs.

* * * * *